Sept. 3, 1935.  C. N. SCOTT  2,013,111
PERIOD CONTROL VALVE FOR PLUNGER LIFT DEVICES
Filed Dec. 31, 1934
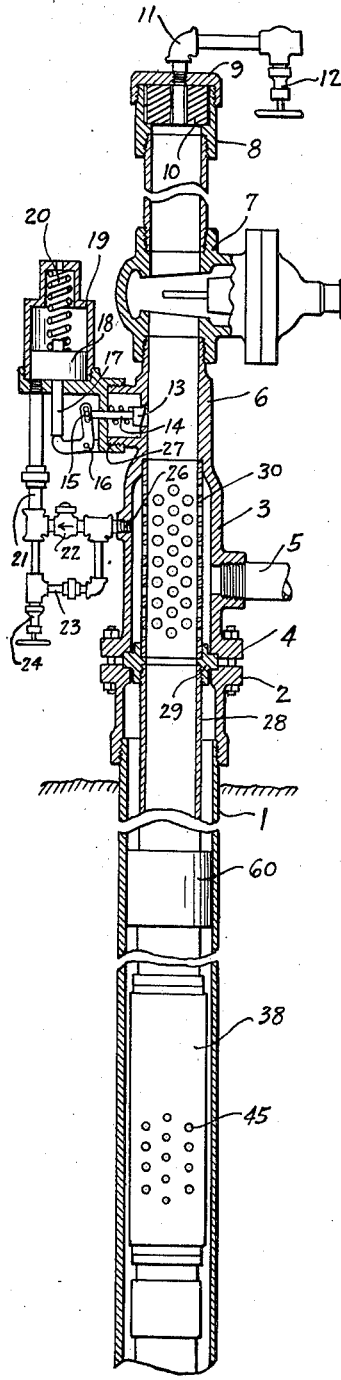
Fig. 1
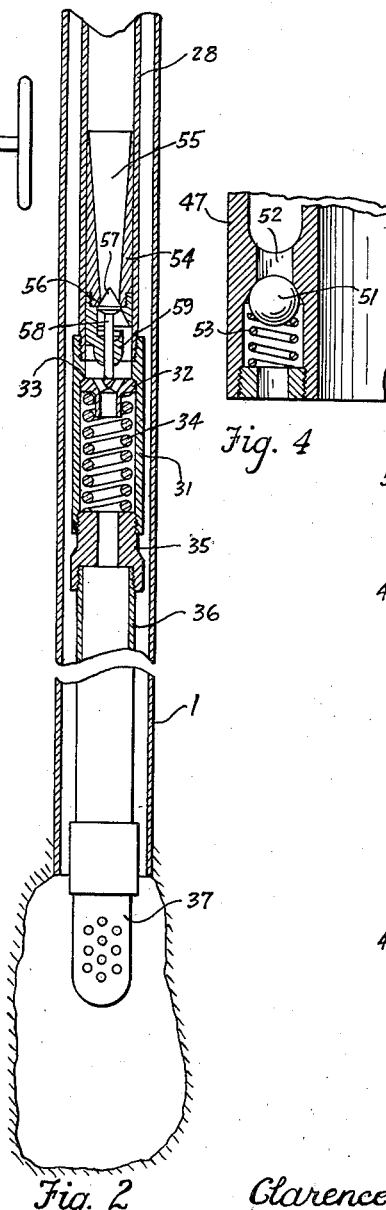
Fig. 2
Fig. 4
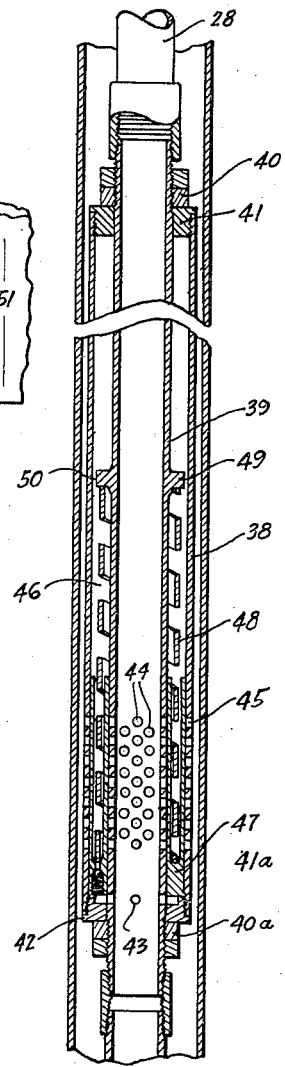
Fig. 3
Clarence N. Scott
INVENTOR.
BY Jesse R. Stone
ATTORNEYS.

Patented Sept. 3, 1935

2,013,111

UNITED STATES PATENT OFFICE 2,013,111

PERIOD CONTROL VALVE FOR PLUNGER LIFT DEVICES

Clarence N. Scott, Houston, Tex.

Application December 31, 1934, Serial No. 759,938

7 Claims. (Cl. 103—52)

My invention relates to plunger lift devices in which pneumatic pressure, preferably gas pressure is employed in raising liquid from wells where a plunger is employed to separate the liquid from the gas.

It is an object to provide an automatically-operated valve which will accomplish a relief of well pressure in the casing at each stroke of the plunger and thus effectively take the pressures from the producing formation. I desire to allow the gas and liquid in the producing stratum to enter the well freely after each cycle of operations in pumping the well so that the pores and interstices in the formation may be kept open.

It is an object to provide a valve which will open at the proper time to allow full use of the well pressures to raise the plunger and its load of liquid and which will then close to allow a further accumulation of fluid pressure in the well.

I also desire to provide means automatically operative to delay the falling of the plunger until the fluid pressure in the well has had time to exhaust through the flow line.

In the drawing herewith Fig. 1 is a central longitudinal section through the upper portion of a well installation embodying my invention.

Fig. 2 is a similar section of the lower end of my apparatus.

Fig. 3 is a sectional detail of my control valve.

Fig. 4 is a broken detail of a relief port employed on the sleeve valve member which I employ.

The well is shown as equipped with a casing 1 having an upper casing head 2 thereon. Above said casing head is a flow head 3, secured to the casing head by the bolt and flange connection 4.

The flow head has a lateral fluid outlet port 5 leading to a separator or place of storage, not shown.

The upper end of the flow head is formed into an eduction tube extension 6 in which I may connect a gate valve 7. The upper end of the extension is closed by a bushing 8 having a cap 9 thereon and housing a tubular rubber shock absorber 10. There is an outlet port 11 at the upper end of the cap 9, normally closed by a valve 12.

A plunger latch and its automatic control mechanism is secured upon the flow head. The latch bolt 13 is extended into an opening in the side of the flow head and has a stem 14 projecting outwardly through the wall of the housing 27 to connect at 15 to a bell crank lever pivoted upon a support at 16. The outer arm of the lever engages the rod 17 upon a piston 18 movable within a cylinder 19 and held resiliently downward by a spring 20.

The cylinder 19 has a port below the piston to which is secured a pipe 21 which connects at its other end with the port 26 in the flow head. There is a check valve 22 in this line allowing passage of fluid from the head to the cylinder.

I provide a bypass around the check valve 22 by way of a small pipe 23 in which is a hand operated choke valve 24.

The eduction tube 28 is secured at its upper end to a flanged supporting coupling 29 which is anchored in the coupling 4 in the casing and acts to close the space between the eduction tube and the casing at that point.

Above the coupling 29 is a perforated nipple 30 connecting the eduction tube with the tube extension 6 above described. The plunger is thus allowed to move past the fluid outlet formed by the perforations in the nipple.

The lower end of the tube 28 is connected to a housing 31 for the stop plate 32 which is held resiliently upwardly against a seat 33 by a spring 34.

The spring 34 is supported upon a nipple 35 coupling the housing 31 with the tube 36 and strainer 37 through which the liquid and gas may enter from the well.

At a point above the level of the oil in the well, I connect in the flow tube a control valve. This valve is preferably housed in an outer housing or barrel. As seen in Fig. 3, the section 39 of the flow tube is threaded at both ends to accommodate nuts 40 and 40a between which is clamped plugs 41 and 41a slidable on the flow tube and threaded exteriorly to the housing 38. The lower plug 41a has an inner annular recess 42 formed therein to which a plurality of ports 43 in the flow tube connect.

The flow tube is also perforated at 44 to allow inlet of fluid. Opposite these openings the housing 38 is perforated at 45.

In the annular space 46 between the housing and the flow tube is a sleeve valve 47 recessed deeply on its upper portion to receive a spring 48 which normally holds the said valve downwardly to close the openings 44 and 45. The upper end of spring 48 bears against a radial flange 49 on the flow tube. Said flange serves not only as a stop for said spring but also constricts the passage of liquid and slows down the rate of movement of the valve so as to prevent pounding of the valve in operation.

I furnish a relief valve in the lower end of the sleeve valve member 47 to relieve any accumulation of pressure fluid above the same. This valve is shown in Fig. 4 as a small ball check valve 51 held upwardly to close passage 52 by a spring 53. Thus fluid above the valve may pass downwardly through the spring-receiving recess in the sleeve valve and find a vent through the passage 52 past valve 51.

The plunger used with my device is of the usual construction. It has a tubular body member 54, fitting loosely within the flow tube. The interior passage 55 is tapered downwardly and has a valve seat 56 at its lower end, to receive the valve 57.

Said valve has a stem 58 projecting downwardly through a support 59 and is adapted to engage the stop plate 32 when the plunger reaches the lower limit of its stroke.

To economize in the amount of gas used, I may place the packer 60 between the flow tube and the casing at some point above the control valve. This packer serves to confine the gas from the well to the chamber in the casing about the lower end of the tube and conserves the gas to that space.

In the operation of my device the plunger falls with the valve open, through the liquid above the stop plate 32 and the valve is closed by contact of the stem 58 with said plate. Gas confined in the casing then builds up sufficient pressure to depress the liquid level until finally the gas may enter through the perforation in the strainer 37 and attain sufficient force to raise the plunger with its load of liquid upwardly in the tube.

As the plunger passes the ports 43 below my control valve, the gas pressure will enter through said ports below the sleeve valve 47 and move it upwardly to expose the openings 44 and 45 and allow free entry of gas in the casing to the flow tube below the plunger. This will accelerate the movement of the plunger.

When the plunger reaches the top of the tubing the load of liquid will have been discharged through the openings in the nipple 30 and the outlet line 5 and the plunger will be moved upwardly into the closed upper end of the flow tube where the valve will be forced open. The latch 13 will then engage below the plunger and hold it from dropping. The gas will exhaust from behind the plunger and relieve the pressure in the tube and casing so as to allow a surge of liquid and gas from the producing formation into the well. The openings 44 and 45 allow gas in the casing to pass up the tube and the well pressure is quickly reduced to approximately atmosphere and may be even lower.

The fluid pressure in the flow head as the plunger approaches the upper end of the tube will be sufficient to force the piston 18 in the cylinder 19 upwardly so as to permit the latch to be moved to plunger-engaging position by the spring behind it. As the fluid pressure in the well head is relieved, however, the fluid below the piston 18 will gradually exhaust through the choke valve 24 and bypass 23 to the flow head and allow the piston 18 to be moved to position to release the latch 13 and allow the plunger to drop. By the proper regulation of the choke valve 24, this release of the plunger may be timed to suit conditions existing in the well, so that the plunger will not reach bottom until the proper level of liquid has been reached by the fresh inrush of fluid.

When the fluid pressure in the well was relieved after the discharge of the load of liquid, the spring 48 above the sleeve valve 47 was able to close that valve against the slight pressure of the fluid through ports 43. When the plunger drops to bottom, therefore, the device is ready for another cycle of operations.

The control valve 47 enables the operator to obtain better lifting effect of his available gas from the well and also permits the rapid and complete exhaust of well pressure so that there will be a reversal of pressures upon the formation to enable the fluid to freely enter the well. This reversal of pressures within the pores and interstices of the formation tends to prevent clogging thereof and keeps them open so that production may continue for comparatively long periods or until the production is exhausted.

The valve is of simple construction and may be easily and economically installed upon any common type of plunger lift device.

What I claim as new is:

1. A plunger lift device for wells including an eduction tube, a fluid outlet at its upper end, a plunger freely movable therein from the lower to the upper end thereof, means to confine gas in the well outside said tube, a control device on said tube above normal liquid level in the well, said device including an outer housing on said tube and concentric therewith, said tube and housing having perforations, a sleeve valve between said tube and housing and acting normally to close said perforations, said valve acting automatically in response to fluid pressure in said tube to open and allow gas to pass from said casing to said tube.

2. A plunger lift device for wells including an eduction tube, a fluid outlet at its upper end, a plunger freely movable therein from the lower to the upper end thereof, means to confine gas in the well outside said tube, a control device on said tube above normal liquid level in the well, said device including an outer housing on said tube and concentric therewith, said tube and housing having perforations, a sleeve valve between said tube and housing and acting normally to close said perforations, inlet ports from said tubing to said housing below said valve whereby a predetermined pressure of fluid in said tube will pass said ports and open said valve.

3. A plunger lift device for wells including an eduction tube, a fluid outlet at its upper end, a plunger freely movable therein from the lower to the upper end thereof, means to confine gas in the well outside said tube, a control device on said tube above normal liquid level in the well, said device including an outer housing on said tube and concentric therewith, said tube and housing having perforations, a sleeve valve between said tube and housing and acting normally to close said perforations, inlet ports from said tubing to said housing below said valve, said valve acting in response to fluid pressure after said plunger has moved upwardly past said ports to open said perforations and permit passage of fluid to said tube from the well.

4. A control valve for eduction tubes of the character described including a housing outside said tube and closed at its upper and lower ends, a valve sleeve between said housing and said tube, said sleeve and tube having opposed perforations therein, a spring acting to normally hold said sleeve in position to close perforations in said sleeve and tube, there being ports from said tube to said housing below said valve.

5. An eduction tube for wells having a fluid inlet at its lower end and a fluid outlet at its upper end, a plunger movable in said tube, means to confine fluid pressure in said well outside said tube, in combination with a control valve slidable on the outer side of said tube, means to normally hold said valve in position to close inlet openings in said tube above the normal liquid level in the well, said valve being moved to open said inlet openings by fluid pressure from said tube.

6. An eduction tube for wells having a fluid inlet at its lower end and a fluid outlet at its upper end, a plunger movable in said tube, means to confine fluid pressure in said well outside said tube, in combination with a control valve slidable on the outer side of said tube, means to normally hold said valve in position to close inlet openings in said tube above the normal liquid level in the well, and fluid-pressure operated means to open said valve to expose said inlet openings when said plunger has passed upwardly past said valve.

7. An eduction tube for wells having an inlet and an outlet at its lower and upper ends respectively, a freely movable plunger in said tube, means to confine pressure fluid in said well outside said tube, a valve on said tube above the liquid level normally closing openings in said tube, said valve being moved to open position by fluid pressure from said tube.

CLARENCE N. SCOTT.